UNITED STATES PATENT OFFICE 2,524,921

UNSATURATED ESTERS AND SYNTHETIC RESINOUS PRODUCTS PRODUCED THEREWITH

Herbert F. Minter, Pittsburgh, Pa., assignor to Westinghouse Electric Corporation, East Pittsburgh, Pa., a corporation of Pennsylvania No Drawing. Application August 30, 1946, Serial No. 694,152

7 Claims. (Cl. 260—45.4)

This invention relates to the preparation of certain complex unsaturated polyesters suitable for use in the preparation of resinous products and the products produced therewith.

Heretofore, a variety of esters have been known in the art as suitable for various applications, many of them being suitable for the preparation of resinous bodies therefrom. However, a number of shortcomings have been encountered in such use of such known esters. Many resin forming esters occur as relatively high molecular weight materials that are slow in forming resinous products when subjected to curing temperatures. Many polymerizable esters are capable only of forming thermoplastic resinous products. Furthermore, many such esters as are capable of forming thermoset polymers do not possess a definite intermediate thermoplastic stage and their utility is limited for this reason. Also, insofar as is known, the thermoset resinous products derived from known esters do not possess sufficiently outstanding physical and chemical properties to warrant their consideration for commercial use. In most cases, during the polymerization of such esters to solid resinous products, considerable evolution of water vapor and other gaseous products occurs and this feature has rendered their use less desirable.

The object of this invention is to provide an unsaturated complex polyester capable of forming resinous products when subjected to polymerization conditions.

Another object of the invention is to provide for a resinous copolymer composed of a complex unsaturated polyester and a polymerizable monomer, the copolymer having an intermediate thermoplastic stage and capable of being cured to a thermoset condition.

A further object of the invention is to provide resinous products composed of a thermoset copolymer of a complex unsaturated polyester and a polymerizable liquid monomer.

Further objects of the invention will, in part, be obvious and will, in part, appear hereinafter. For a better understanding of the nature and objects of the invention, reference should be had to the following detailed description, in which the complex unsaturated polyesters of this invention have the general formula similar to the following:

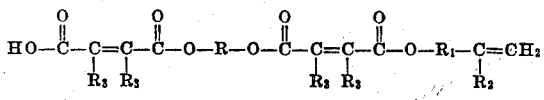

Where R is a radical derivable from a polyhydric alcohol; $R_1$ is an aliphatic radical containing 1 or 2 carbon atoms; $R_2$ represents hydrogen, halogen, methyl, amine or other simple organic group incapable of hindering polymerization of the unsaturated linkage of the carbon atom to which it is attached; and where $R_3$ represents hydrogen, halogen, or methyl radicals.

In general, the unsaturated complex polyesters of this invention may be considered to be identical with the polyesters produced by reacting one mole of a polyhydric alcohol with at least one mole of an olefinic alpha, beta dicarboxylic anhydride to produce an acid half ester in which at least one hydroxyl group per molecule of the polyhydric alcohol is unreacted, reacting the resulting hydroxy acid half ester with a polymerizable olefinic monohydric alcohol in an amount sufficient to esterify all of the carboxyl groups thereof, and reacting the resulting complex ester with additional olefinic anhydride to esterify the remaining hydroxyl groups. The resulting unsaturated polyester has at least one carboxyl terminal group. The presence of the carboxyl terminal group activates the unsaturated group attached thereto whereby it will readily react with other unsaturated polymerizable monomers to form useful copolymers. The same product may be produced with other reactants as will be indicated subsequently.

The following examples are illustrative of the preparation of the unsaturated polyester.

Example I

Propylene glycol _____ 228 grams (ca. 3 moles)
Maleic anhydride _____ 294 grams (ca. 3 moles)

were reacted for five hours at 80° C. in a closed reaction vessel. The final acid number of the product was 332 and indicated the formation of the acid half ester propylene glycol monomaleate.

348 grams (2 moles) of the propylene glycol monomaleate were admixed with a molar excess (ca. 6 moles) of allyl alcohol and 8 c. c. of concentrated hydrochloric acid and refluxed for four hours at temperature of up to 100° C. At the end of this period unreacted allyl alcohol and water were removed by distillation. The acid number of the product was about 80—partly due to the hydrochloric acid. Two moles of the resulting propylene glycol allyl maleate were reacted with two moles of maleic anhydride at a temperature of from 105° C. to 110° C. for from one to two hours. After distilling off unreacted material and water, the product was the unsaturated complex polyester of this invention, viz., half allyl ester of propylene glycol dimaleate.

*Example II*

Ethylene glycol_____ 62 grams (1 mole)
Maleic anhydride_____ 98 grams (1 mole)

were reacted in a closed reaction vessel at 80° C. for 20 minutes. The resulting product was the ethylene glycol maleate acid half ester. Allyl alcohol greatly in excess of 1 mole (130 grams) was added and the mixture allowed to reflux for four hours at temperatures of up to 100° C. At the end of this time, the excess alcohol and water formed during esterification was removed by vacuum distillation. The product was the allyl ethylene glycol maleate ester. The acid number was less than 80. A second mole of maleic anhydride was then added to esterify the remaining hydroxyl group on the ethyl glycol. The reaction temperature was maintained below 100° C. and continued for about twenty minutes. The product of this reaction was the half allyl ester of ethylene glycol dimaleate.

For the preparation of the complex polyesters, various saturated aliphatic polyhydric alcohols may be employed. Any polyhydric alcohol containing 2 or more esterifiable hydroxyl groups or mixtures of such alcohols may be employed. Examples of suitable polyhydric alcohols are ethylene glycol, propylene glycol, glycerol, 1,3-butanediol, diethylene glycol, polyglycols and pentaerythritol.

Olefinic alpha, beta dicarboxylic acids and anhydrides thereof as well as monoacyl chlorolefinic carboxyl acids, may be employed in esterifying the polyhydric alcohols. Examples of suitable acidic compounds of this type are maleic anhydride, maleic acid, fumaric acid, chloromaleic anhydride and citraconic anhydride. The anhydrides, in general, will be preferred since they are esterified with a glycol by a simple addition reaction without water being split off as is required with dicarboxylic acids. A lower temperature is sufficient to produce esters with the anhydrides and the lower temperatures are desirable since premature polymerization through unsaturated bonds is a minimum at lower temperatures.

Suitable unsaturated or olefinic polymerizable monohydric alcohols for practice of the invention are allyl alcohol, methallyl alcohol, beta chloroallyl alcohol and 1,2-butenol 4.

During the reaction of the mixture of glycol and olefinic dibasic acid the acid half ester is preferentially produced since the remaining hydroxyl group in the glycol is rendered much less reactive. Furthermore, an olefinic anhydride in reacting with an alcohol to form an ester adds the hydroxyl group to produce a terminal carboxyl group having a diminished reactivity as long as any anhydride is present. Therefore, the acid half ester is preferentially produced in the reaction.

It is possible to prepare the complex polyesters by the use of chlorohydrins instead of glycols or other polyhydric alcohols. The olefinic dibasic acid, after reaction at the hydroxyl group of the chlorohydrin, such, for example, as 2-chlorethanol, to produce an ester, may be treated with allyl alcohol to produce a complex ester, and the product may then be placed in an alkaline solution wherein the chlorine atom saponifies off to produce the corresponding hydroxy ester.

An alternate reaction is to react one mole of an aliphatic epoxide, such, for example, as ethylene oxide with an olefinic alpha, beta dicarboxylic acid. The hydroxy acid half ester produced may then be reacted with allyl alcohol or other olefinic alcohol, and subsequently treated as set forth in Examples I and II. Equations believed to represent the reactions are as follows:

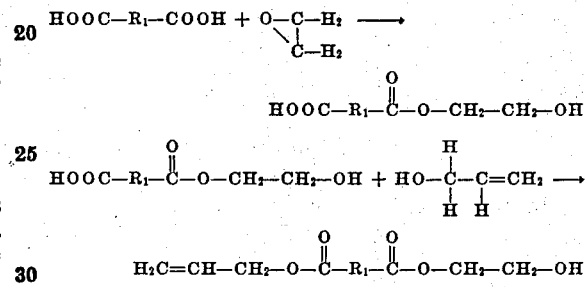

An example of a still further procedure for producing the complex unsaturated polyester is to react allyl alcohol with maleic anhydride to produce the acid half ester allyl maleate which can be reacted with an epoxide, such as propylene oxide, to produce a hydroxy propylene allyl maleate ester which can be then reacted with maleic anhydride to produce the unsaturated polyester of this invention:

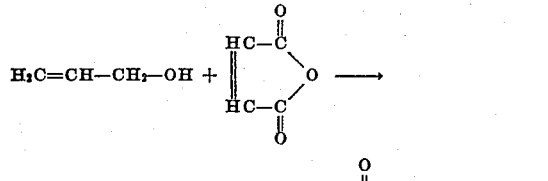

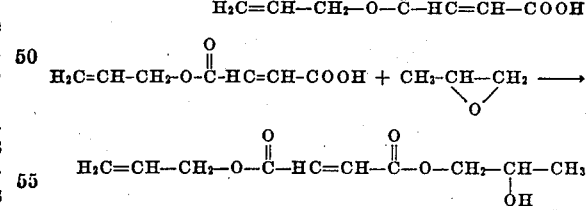

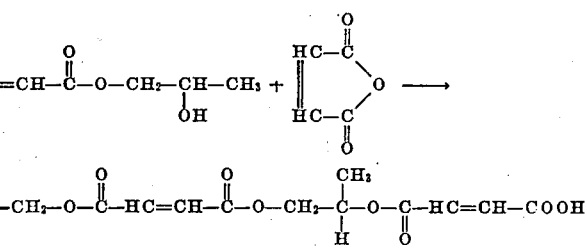

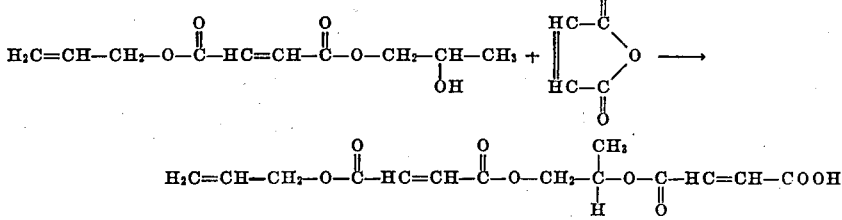

The unsaturated complex polyesters produced in accordance with this invention have been found to react readily with various polymerizable liquid monomers having the group $H_2C=C<$. Examples of suitable polymerizable liquid monomers are monostyrene, distyrene, paramethyl styrene, methyl vinyl ketone, acrylonitrite, methyl methacrylate, ethyl acrylate and allyl esters, such as diallyl phthalate. From one to twenty moles of the monomer per mole of the polyester may be reacted into a potentially thermosetting copolymer.

A suitable procedure for copolymerizing the liquid polymerizable monomers having the group $H_2C=C<$ and the complex unsaturated polyesters may be conveniently carried out by refluxing a mixture thereof in a low boiling point solvent. Acetone has proved to be a satisfactory refluxing medium. Alcohols, such as ethanol, or benzene, may be added thereto. A catalyst capable of causing vinyl type polymerization should be present. Suitable catalysts are benzoyl peroxide, tertbutyl perbenzoate and lauroyl peroxide. From ¼% to 1% by weight or less of the reactants is sufficient. The following examples illustrate this feature of the invention:

Example III 131.3 grams of the complex ester of Example I was admixed with 43.7 grams of monostyrene (mole ratio 1:1), acetone added to produce a 25% solution, and 0.9 gram of benzoyl peroxide was added. The solution was refluxed at a temperature of 60° C. for eight hours. The solution was poured in a thin stream into a large volume of rapidly stirred water and the copolymer precipitated as a flocculent or fibrous precipitate. The copolymerization is believed to have taken place at the unsaturated group in the monostyrene and the unsaturated group in the terminal maleic acid group.

Example IV 50 grams (1 mole) of the polyester of Example I was admixed with 50 grams (3 moles) of monostyrene and the mixture put into 300 parts of acetone and 1 part of benzoyl peroxide was added thereto. After refluxing for six hours at a temperature of about 60° C., the mixture was run into water with rapid stirring to produce a flocculent precipitate.

Example V 1 mole of the complex ester of Example II was admixed with 1 mole of monostyrene and diluted with sufficient acetone to provide a 50% solution. 1% by weight of benzoyl peroxide was added and the mixture refluxed for ten hours. The resulting acetone solution could be used for impregnating fibrous materials, such as cloth or paper, or it could be mixed with a large quantity of water or alcohol to precipitate the polymer as a fine powder.

The precipitates of Examples III, IV and V after drying could be molded under heat and pressure into hard thermoset resinous members. Temperatures of 150° C. and pressure of several hundred pounds per square inch for ten minutes are sufficient to produce dense resinous products free from flaws, pores or other imperfections since no water vapor is given off during the reaction to a thermoset resin. The powdered precipitates may be combined with fillers, such as talc, mica, silica, powdered asbestos, wood flour and the like as well as mold lubricants, pigments and dyes in the preparation of molding powders therefrom.

The precipitated copolymer solids may be readily dissolved in ketones, such, for example, as acetone, cyclohexanone and diethyl ketone. Some alcohol, such as ethanol and methanol, or benzene, may be added to the ketones. The solutions produced may be used as coating compositions, impregnants and other applications. On evaporating the solvent, a coating of the composition will cure in a very short time at a temperature above 100° C. into hard, dry films of thermoset resin.

The copolymers of the unsaturated complex esters and the monomer having the group $H_2C=C<$ have been found to have an intermediate thermoplastic or "B" stage previous to thermosetting. Solutions of the copolymers of Examples III to V, in the acetone refluxing medium, may be applied to kraft paper, asbestos paper, asbestos cloth, cotton duck and glass cloth or similar materials and heated to evaporate the solvent. The copolymer will be present as a relatively dry coating on the fibrous material. The treated fibrous material may then be cut into predetermined size sheets or macerated or chopped and molds filled therewith. Upon applying a moderate pressure of from 50 p. s. i. to 1000 p. s. i., at temperatures of from 100° C. to 180° C., the resinous copolymers are rendered temporarily thermoplastic whereby the compressed fibrous material is thoroughly impregnated with the copolymer and thereafter the copolymer is converted into a thermoset resinous product. No gaseous products are evolved during the polymerization and, therefore, laminates of outstanding quality, free from surface and internal imperfections are produced. Asbestos board laminates produced therefrom are extremely hard and durable. They are much less brittle than corresponding phenolic laminates. The electrical properties have been found to be excellent and the material has utility for electrical insulation applications.

The copolymers, such as the products of Examples of III to V, are soluble in excess of the monomer, such as monostyrene, and are reactive therewith to produce completely reactive varnishes or impregnants of a thermoset nature.

It will be understood that the compositions and processes described herein are illustrative of the invention and are not limiting.

I claim as my invention:

1. A composition comprising the potentially reactive copolymer of (a) one mole of the complex unsaturated acid polyester derived by reacting at a temperature of approximately 80° C., one mole of a saturated hydrocarbon polyhydric alcohol with one mol of an olefinic acidic substance selected from the group consisting of olefinic alpha, beta dicarboxylic acid anhydrides and monoacyl chloride monocarboxylic olefins to produce an acid half ester in which at least one hydroxyl group on the average of the polyhydric alcohol is unreacted, reacting the resulting acid half ester with a polymerizable olefinic monohydric hydrocarbon alcohol in an amount sufficient to esterify all of the carboxyl groups in the acid half ester, and reacting at a temperature not exceeding 110° C. the resulting complex ester with additional amounts of the aforementioned olefinic acidic compound to esterify each of the remaining hydroxyl groups of the ester, thereby providing an unsaturated polyester having at least one carboxyl terminal group, and (b) between one and twenty moles of a liquid polymerizable monomer having the group $H_2C=C<$, the polyester (a) and monomer (b) being refluxed below 100° C. in contact with a vinyl polymerization catalyst.

2. A composition comprising the potentially reactive copolymer of (a) one mole of the unsaturated acid complex polyester derived by reacting at a temperature of approximately 80° C. one mole of a saturated hydrocarbon glycol with one mole of maleic anhydride to produce a hydroxy acid half ester, reacting the hydroxy acid half ester with one mole of allyl alcohol to produce a hydroxy polyester and reacting at a temperature not exceeding 110° C. the hydroxy polyester with one mole of the maleic anhydride to esterify the polyester at the hydroxy group to provide a complex polyester having a carboxyl terminal group, and (b) between one and twenty moles of a liquid polymerizable monomer having the group $H_2C=C<$, the polyester (a) and monomer (b) being refluxed below 100° C. in contact with a vinyl polymeriaztion catalyst.

3. A composition comprising the potentially reactive copolymer of (a) one mole of the complex unsaturated acid polyester derived by reacting at a temperature of approximately 80° C. one mole of a saturated hydrocarbon polyhydric alcohol with one mole of an olefinic acidic compound selected from the group consisting of olefinic alpha, beta dicarboxylic acid anhydrides and monoacyl chloride monocarboxylic olefins to produce an acid half ester in which at least one hydroxyl group of the average of the polyhydric alcohol is unreacted, reacting the resulting acid half ester with a polymerizable olefinic monohydric hydrocarbon alcohol in an amount sufficient to esterify all of the carboxyl groups in the acid half ester, and reacting at a temperature not exceeding 110° C. the resulting complex ester with additional amounts of the aforementioned olefinic acidic compound to esterify each of the remaining hydroxyl groups, thereby providing an unsaturated polyester having at least one carboxyl terminal group, and (b) from one to twenty moles of monostyrene, the polyester (a) and monostyrene (b) being refluxed below 100° C. in contact with a vinyl polymerization catalyst.

4. A composition comprising the potentially reactive copolymer of (a) one mole of the unsaturated acid polyester derived by reacting at a temperature of approximately 80 C. one mole of a saturated hydrocarbon glycol with one mole of maleic anhydride to produce a hydroxy acid half ester, reacting the hydroxy acid half ester with one mole of allyl alcohol to produce a hydroxy polyester and reacting at a temperature not exceeding 110° C. with the hydroxy polyester one mole of the maleic anhydride to esterify the polyester at the hydroxy group to provide a complex polyester having a carboxyl terminal group, and (b) from one to twenty moles of monostyrene, the polyester (a) and monostyrene (b) being refluxed below 100° C. in contact with a vinyl polymerization catalyst.

5. The thermoset resinous product comprising the cured copolymer of (a) one mole of the complex unsaturated acid polyester derived by reacting at a temperature of approximately 80° C. one mole of a saturated hydrocarbon polyhydric alcohol with one mole of an olefinic acidic compound selected from the group consisting of olefinic alpha, beta dicarboxylic acid anhydrides and monoacyl chloride monocarboxylic olefins to produce an acid half ester in which at least one hydroxyl group on the average of the polyhydric alcohol is unreacted, reacting the resulting acid half ester with a polymerizable olefinic monohydric hydrocarbon alcohol in an amount sufficient to esterify all of the carboxyl groups in the acid half ester, and reacting at a temperature not exceeding 110° C. the resulting complex ester with additional of the aforementioned olefinic acidic compound to esterify each of the remaining hydroxyl groups, thereby providing an unsaturated polyester having at least one carboxyl terminal group, and (b) from one to twenty moles of a liquid polymerizable monomer having the group $H_2C=C<$, the polyester (a) and monomer (b) being refluxed below 100° C. in contact with a vinyl polymerization catalyst.

6. The thermoset resinous reaction product comprising the copolymer of (a) one mole of the unsaturated acid polyester derived by reacting at a temperature of approximately 80° C. one mole of a saturated hydrocarbon glycol with one mole of maleic anhydride to produce a hydroxy acid half ester, reacting the hydroxy acid half ester with one mole of allyl alcohol to produce a hydroxy polyester and reacting at a temperature not exceeding 110° C. the hydroxy polyester with one mole of the maleic anhydride to esterify the polyester at the hydroxy group to provide a complex polyester having a carboxyl terminal group, and (b) from one to twenty moles of monostyrene, the polyester (a) and monostyrene (b) being refluxed below 100° C. contact with a vinyl polymerization catalyst.

7. An article of manufacture comprising a fibrous base material coated and at least partly impregnated with a composition comprising the potentially reactive copolymer of (a) one mole of the complex unsaturated acid polyester produced by reacting at a temperature of approximately 80° C. one mole of a saturated hydrocarbon polyhydric alcohol with one mole of an olefinic acidic compound selected from the group consisting of olefinic alpha, beta dicarboxylic acid anhydrides and monoacyl chloride monocarboxylic olefins to produce an acid half ester in which at least one hydroxyl group on the average of the polyhydric alcohol is unreacted, reacting the resulting acid half ester with a polymerizable olefinic monohydric hydrocarbon alcohol in an amount sufficient to esterify all of the carboxyl groups in the acid half ester, and reacting at a temperature not exceeding 110° C. the resulting complex ester with additional amounts of the aforementioned olefinic acidic compound to esterify each of the remaining hydroxyl groups, thereby providing an unsaturated polyester having at least one carboxyl terminal group, and (b) between one and twenty moles of a liquid polymerizable monomer having the group $H_2C=C<$, the polyester (a) and monomer (b) being refluxed below 100° C. in contact with a vinyl polymerization catalyst.

HERBERT F. MINTER.

REFERENCES CITED

The following references are of record in the file of this patent:

UNITED STATES PATENTS

| Number | Name | Date |
|---|---|---|
| 2,280,242 | Kropa et al. | Apr. 21, 1942 |
| 2,409,633 | Kropa | Oct. 22, 1946 |
| 2,418,633 | Gould | Apr. 8, 1947 |

FOREIGN PATENTS

| Number | Country | Date |
|---|---|---|
| 548,137 | Great Britain | Sept. 28, 1942 |